April 14, 1959 T. KILBURN ET AL 2,881,978

BINARY SERIAL DIVIDING APPARATUS

Filed Dec. 11, 1951 7 Sheets-Sheet 1

INVENTORS:
T. KILBURN
D. L. H. GIBBINGS
ATTORNEYS:
Morse & Hall

INVENTORS:
T. KILBURN
D. L. H. GIBBINGS
ATTORNEYS
Moore & Hall

INVENTORS:
T. KILBURN
D. L. H. GIBBINGS
ATTORNEYS:
Morse & Hall

April 14, 1959 T. KILBURN ET AL 2,881,978

BINARY SERIAL DIVIDING APPARATUS

Filed Dec. 11, 1951 7 Sheets-Sheet 4

INVENTORS:
T. KILBURN
D. L. H. GIBBINGS

ATTORNEYS:
Morse & Hall

Inventors:
Tom Kilburn
Dennis Lawrence Harold Gibbings
By:
Stevens, Davis, Miller + Mosher
Attorneys April 14, 1959

T. KILBURN ET AL 2,881,978

BINARY SERIAL DIVIDING APPARATUS

Filed Dec. 11, 1951

7 Sheets-Sheet 6

Inventors:
Tom Kilburn
Dennis Lawrence Hardl Tibbing
By: Stevens, Davis, Miller & Mosher, Attorneys INVENTORS:
T. KILBURN
D. L. H. GIBBINGS
ATTORNEYS:
Moore & Hall United States Patent Office 2,881,978
Patented Apr. 14, 1959

2,881,978

BINARY SERIAL DIVIDING APPARATUS

Tom Kilburn, Davyhulme, Manchester, England, and Dennis Lawrence Harold Gibbings, Claremont, Tasmania, Australia, assignors to National Research Development Corporation, London, England, a corporation of Great Britain Application December 11, 1951, Serial No. 261,088

Claims priority, application Great Britain December 22, 1950

8 Claims. (Cl. 235—164)

This invention relates to binary digital computing apparatus and is more particularly concerned with arrangements for effecting division of binary numbers in, for example, electronic digital computing machines, and suitable for finding the quotient of two positive binary numbers when the latter are each expressed in dynamic form as electric pulse signals, for instance, as pulse signal trains wherein each binary digit "1" is signalled by the presence of a pulse and each binary digit "0" is signalled by the absence of a pulse during the various sequential digit-intervals of progressively different binary significance in the pulse signal train. Examples of electronic digital computing machines with which the present invention is particularly adapted for use are those described in an article in "Nature," October 22, 1949, pp. 684–687 by T. Kilburn and in a paper by F. C. Williams, T. Kilburn and G. C. Tootill, Proc. I. E. E. London, February 1951, vol. 98, part II, p. 13 and also in the specifications of the following copending patent applications.

Application Serial No. 141,176, filed January 30, 1950, now Patent No. 2,755,994, issued July 24, 1956.

Application Serial No. 165,434, filed June 1, 1950, now Patent No. 2,810,516, issued October 22, 1957.

Application Serial No. 226,761, filed May 17, 1951, now Patent No. 2,840,304, issued June 24, 1958.

These electronic digital computing machines are characterised by the use of cathode-ray-tube storage devices as described more particularly in the paper by F. C. Williams and T. Kilburn, Proc. I. E. E. London, March 1949, vol. 96, part III, p. 81 and in the specifications of the following copending applications.

Application Serial No. 50,136, filed September 20, 1948.

Application Serial No. 124,192, filed October 3, 1949.

In accordance with the broadest aspect of the invention the required division is effected by first multiplying either the dividend number D or the divisor number Y by a suitable power of 2 to form operative dividend and divisor numbers $D^x$ and $Y^x$ such that $D^x - Y^x$ is equal to or greater than zero whereas $D^x - 2Y^x$ is less than zero, then adding the complement of the divisor number $Y^x$ to the dividend number $D^x$ and thereafter successively adding either the divisor number $Y^x$ or its complement to twice the resultant remainder number $Rm$ from each preceding operative step according to whether such remainder number $Rm$ has negative or positive sign, zero being counted as positive, the digits of the required quotient number Q being obtained in descending order of magnitude by recording a binary "0" digit for each occurrence of a negative remainder number and a binary "1" digit for each occurrence of a positive remainder number and then correcting said recorded number in accordance with the initial multiplication of the dividend or divisor number D or Y in the formation of the operative dividend and divisor number $D^x$ and $Y^x$.

In one preferred form of apparatus for carrying out the above described steps there is provided a storage device having at least two alternative number storage locations, one for the dividend number $D^x$ and the other for the derived quotient number Q, and provided with reading-out and writing-in arrangements arranged in a regenerative loop which includes an adding circuit and a multiplying circuit for doubling the value of the output number from such adding circuit before effecting its rewriting in the same location of the store, the second input to said adding circuit being provided with number-complementing means and means for controlling the effectiveness of such complementing means, the requisite controlling influence for said last mentioned means being derived from sign-testing means which is supplied with the output number emerging from the adding circuit.

In order that the various features of the invention may be more readily understood one embodiment thereof will now be described with reference to the accompanying drawings in which:

Figs. 1*a* and 1*b* form, in combination, a block schematic diagram of the principal elements of an electronic digital computing machine and the various and more detailed elements of the dividing arrangements according to the invention.

Figs. 2 and 3 each comprise a series of waveform diagrams illustrative of various controlling potentials used in the machine and in the dividing arrangements while Fig. 4 illustrates in schematic form a suitable complementing circuit.

In order to reduce the complexity of the drawings and of the accompanying description use is made of a number of symbols for illustrating different circuit elements of the described embodiment of the invention. These symbols are shown in Figs. 5–9 while their respective practical circuit counterparts are illustrated in Figs. 13–17.

Figure 5:
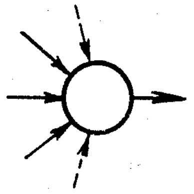
Figs. 5–9 illustrate the form of symbols used to denote different circuit elements of the described embodiment of the invention.
Figure 13:
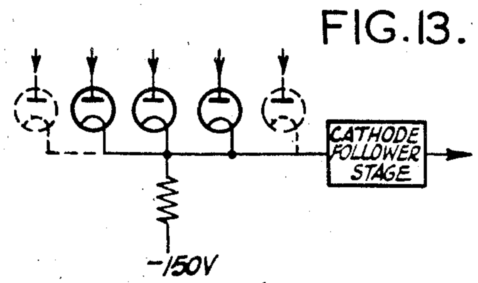
Figs. 13–17 illustrate practical circuit counterparts of the symbols shown respectively in Figs. 5–9.
Figure 6:
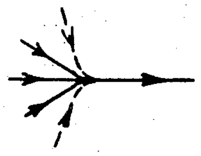
Figure 14:
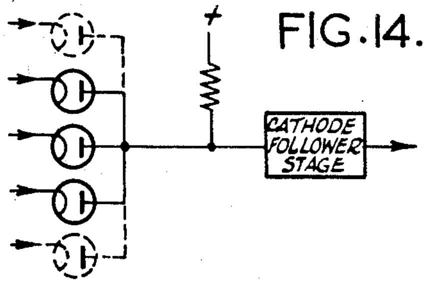
Figure 7:
Figure 15:
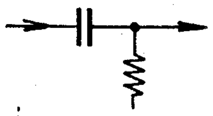
Figure 8:
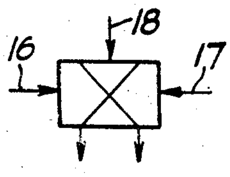
Figure 16:
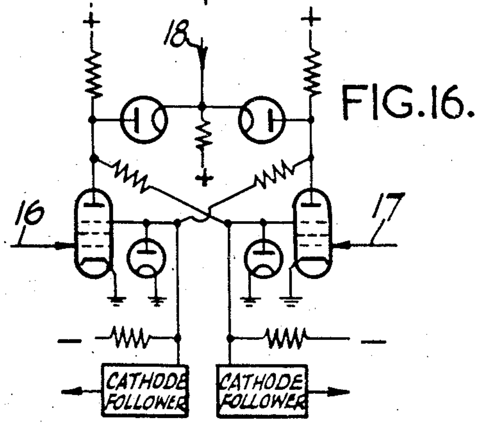
Figure 9:
Figure 17:
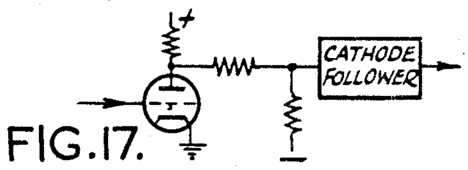

Thus Fig. 5 illustrates and "And" or coincidence gate (hereinafter called, for brevity, a gate) which may conveniently be of the multiple-diode type as shown in Fig. 13. Fig. 6 illustrates a buffer circuit or "Or" gate which may have as its practical circuit form that shown in Fig. 14. Fig. 7 shows the symbol indicating the inclusion in a conductor of a differentiating circuit such as that illustrated in Fig. 15. Fig. 8 shows the symbol for a conventional two-stable-state trigger circuit such as that illustrated in Fig. 16 and having a separate triggering input 16, a resetting input 17 and a combined state-reversing input 18. Fig. 8 shows the symbol used to denote an inverter or phase-reversing circuit such as that shown in Fig. 17.

Figure 1A:
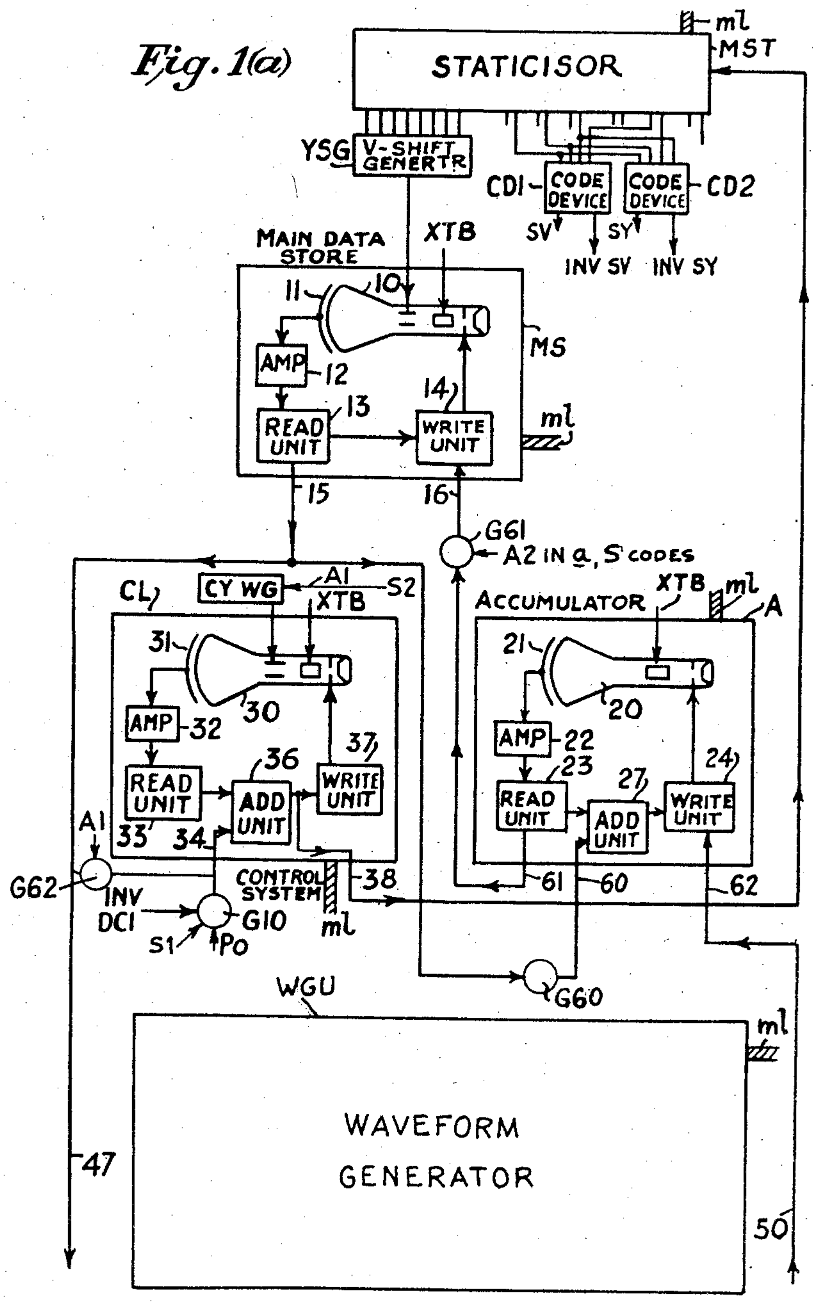

Referring first to Fig. 1*a*, the electronic digital computing machine, to which the dividing arrangement according to the invention is shown applied, is one following the general lines of that described in the aforesaid reference article by T. Kilburn and reference paper by Williams, Kilburn and Tootill and includes a main data store MS, a staticisor unit MST comprising the usual plurality of separate sections, one for each digit of the basic instruction word length and operable to effect control of address selection within the main store MS through a Y-shift generator YSG and also to control various routing gates G and the like in the various transfer channels between the machine elements, a control unit CL which controls the step-by-step operation of the machine, an accumulator or arithmetical organ A for performing one or more types of computing operation with numbers supplied thereto, and a series of waveform generating devices shown collectively as the waveform generating unit WGU by which the basic operating rhythm of the machine is determined.

The machine operates with a basic number length of 40-digits and with a normal rhythm of four minor cycles or beats in every major cycle or bar. The bar interval time is that required to perform one complete step in the computation operation while the beat interval time is that required to deal with the dynamic expression, in serial pulse train form, of one 40-digit number or instruction word. Each beat interval is of 450 microseconds duration with a single digit-interval time of 10 microseconds.

The main data store MS employs cathode-ray-tube storage devices as described in the aforesaid paper by Williams and Kilburn and is shown as having a cathode-ray-tube 10 with its signal pick-up plate 11 feeding its signal output to an amplifier 12 which in turn supplies a read unit 13 by which the amplifier output signals are converted into pulse train form suitable for use in the rest of the computing machine by way of output lead 15 and/or for supply to a write unit 14 by which such pulse train signal from the read unit 13 is caused to remodulate the beam of the tube 10 so as to rewrite or regenerate the previously stored signals. Alternatively, the write unit 14 may be controlled by an externally available input signal on input lead 16 to cause such signal to be written into the store instead of any previously stored signal. Although only one storage tube 10 with its ancillary apparatus is shown in the main store MS there will normally be a number of such tubes and the control unit CL will, through the staticisor MST, arrange for the selection of the appropriate one as part of its normal function.

Figure 2:
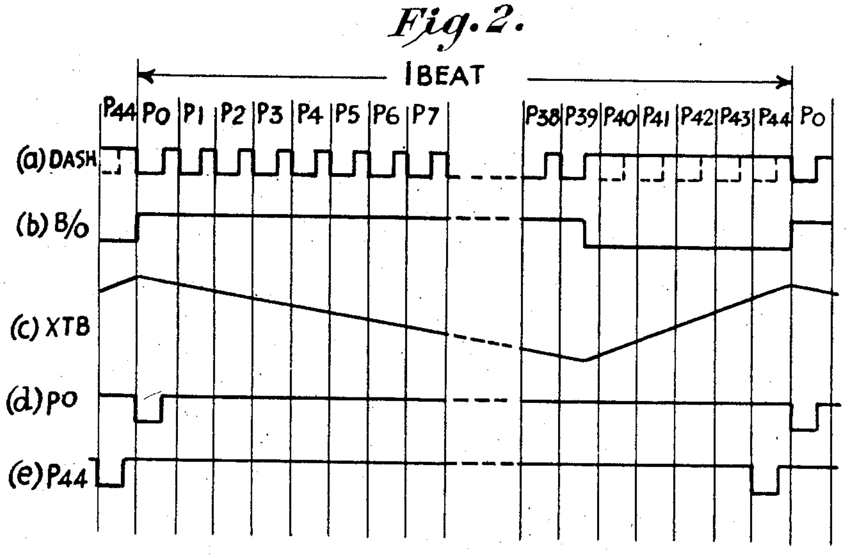

The tube 10 has a storage capacity of 32 separate 40-digit numbers each arranged on one of 32 horizontal lines of a television type raster pattern on a cathode-ray-tube screen. Scanning of any line is effected in synchronism with each beat period by means of an X-time base or XTB waveform as shown in Fig. 2(*c*) and Fig. 3(*b*). Selection of a desired line or storage location is provided by means of the Y-scan generator circuit YSG which, under the control of certain section of the staticisor unit MSG can cause selection of any desired one of the 32 scanning lines in accordance with the digit significance of certain digit positions of an instruction number applied by the control unit CL to the staticisor. For the purpose of regenerating the stored numbers the Y-scan generator YSG is arranged so that normally it automatically provides for regular regeneration of every line of the store in turn during alternate and so-called Scan beats of the machine rhythm and makes available for use in a computing operation any desired line as selected by the concurrent setting of the staticisor MST during the intervening or Action beats.

The accumulator A similarly comprises a cathode-ray-tube storage device consisting of a cathode-ray-tube 20 with its signal pick-up plate 21, amplifier 22, read unit 23 and write unit 24 similar to the main store MS. This accumulator, however, has a suitable computing or arithmetical unit, such as the adder circuit 27, included in its regenerative loop whereby the number which is rewritten at any time into the store can be the result of a desired arithmetical operation between the previously stored signal which is being read out through read unit 23 and a further external number signal applied over lead 60 from the read output lead 15 of the main store MS through gate G60 which is opened in beat A2 of each bar.

The accumulator is arranged, in this instance with one storage line only and in consequence is supplied only with the X-Time Base waveform for scanning such line in every beat. Stored signals can be read out from the accumulator A to the main store MS by way of read unit 23, lead 61 and gate G61 which is opened during beat A2 of any bar when an accumulator, to-store (*a*, S) transfer is ordered by an instruction staticised in the staticisor MST, while input signals can be applied direct to the write unit 24 of the accumulator A by way of a lead 50 from the dividing apparatus yet to be described.

The control unit CL also includes a cathode ray tube storage device including cathode ray tube 30 with its pick-up plate 31 feeding signals through amplifier 32 to a read-unit 33. The read output from the latter is applied as one of the two inputs of an adding circuit 36 whose output is available externally on lead 38 and also provides one input to write-unit 37 for modulating the tube beam to effect writing-in of an applied number signal. The second input to the adding circuit 36 is applied by way of lead 34 and is derived either from gate G10 which controls the supply of the *p*0-Pulse waveform during beat S1 of each bar under the control of the DC1 waveform which will be referred to later or, alternatively, from the read output lead 15 of the main store MS through gate G62 which is opened during the A1 beat of each bar. The beam of the tube 30 is arranged to scan on one or the other of two lines and, for this purpose, the tube is supplied with the X-Time Base waveform and a CY-waveform provided by the deflection waveform generator CYWG controlled by the S1 and A2 waveforms and having the form shown in Fig. 3(*c*) whereby the first line, known as the CI line, is scanned during the first, S1, and the last, A2, beat of each bar whereas the other line, known as the PI line, is scanned during the second, A1, and the third, S2, beats of each bar.

The above mentioned papers by Williams and Kilburn and by Williams, Kilburn and Tootill and the copending applications, give adequate detailed description of the various parts referred to above and should be consulted for further information.

Briefly, the manner of operation of the machine is as follows. Signals representing both the numbers required for a computation and the various sequential instructions (in a form resembling binary numbers) are initially loaded into the main store MS with the various instructions at sequential address locations in the order in which they are to be obeyed. Hereinafter for brevity the term "number" is to be read as including within its meaning an electric signal representing such number. A number, known as the CI number is inserted on the CI line of the control unit CL with its digit value equal to one less than the address location number of the main store MS where the first of the sequential instructions is located.

In the first beat, S1, of the first bar, an externally derived +1 signal in the form of a 1 digit representing pulse, known as a *p*0-Pulse in the first or lowest value ($2^0$) position of a number-representing pulse signal train is fed through now-opened gate G10 and over lead 34 to the adder circuit 36 of the control unit CL as the CI number is being regenerated through read unit 33 so that a new CI number of previous $CI+1$ is rewritten into the same CI line. This new number is also supplied by way of lead 38 to the address selecting sections of the staticisor MST. During the same S1 beat, the main store MS has been regenerating on one line chosen by the Y-shift generator YSG while the single line of the accumulator has likewise been regenerated. During the next, A1, beat the staticisor (set up with the new CI number) operates to select the address line of the first required instruction (P.I) in the main store MS which is accordingly read out and is transferred through lead 15, now-opened gate G62 and lead 34 to adding unit 36 (which now has no first input) and so to the now-operative P.I. line of the control unit CL. In the next following beat, S2, the main store MS again regenerates one, different storage line while the aforesaid P.I. number just transferred to the control unit CL is read out again through read unit 33, adding unit 36 (which now has no second input) and lead 38 to the staticisor MST. In the final beat, A2, of the bar the staticisor MST, which is now set up with the configuration of the first instruction, serves to cause selection of the address of the first number data item required and also by application of different combinations of the output potentials available from certain sections of the staticisor, devoted to the function control of the machine, causes the appropriate opening or closing of the various gates G (which may resemble in form those shown and described in connection with Figs. 5 and 13 of the drawings) to provide the desired transfer channel, say to the accumulator A, for the passage of such selected number which is then read out to its proper destination, for instance, via lead 15, gate G60 and lead 60 to the adding unit 27 of the accumulator A. In the next bar the CI number is automatically changed again to select the next instruction and the process repeated and so on until all the instructions have been worked through.

Figure 10:
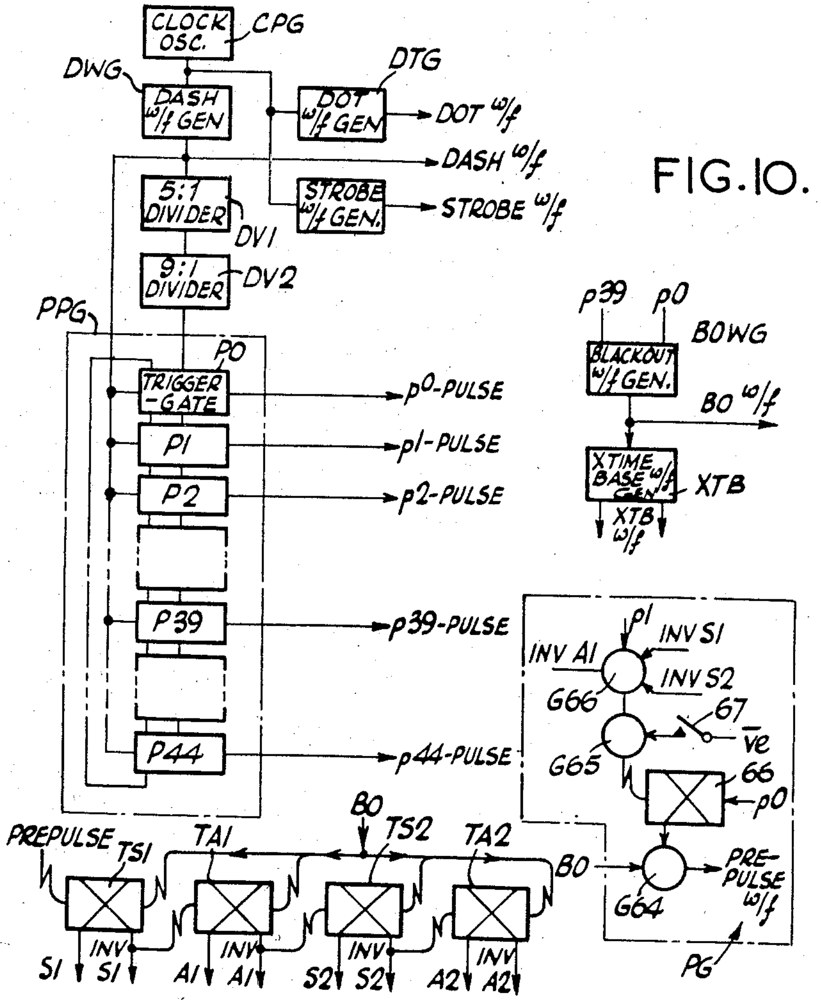
Fig. 10 illustrates, in some detail, the arrangements of the waveform generator WGU.

The waveform generator unit WGU is illustrated in some detail in Fig. 10 and includes a 100 kc./s. master or clock oscillator CPG which forms the basic rhythm control of the machine. From this oscillation is derived the Dash waveform of Fig. 2(*a*) by asymmetrical squaring, in unit DWG, of the clock oscillations to form a series of negative-going square pulses which persist for the first six microseconds of every ten microsecond oscillation period, which latter constitute the digit-intervals of the machine rhythm. Whenever a negative Dash pulse is present in a dynamic signal train during any given digit-interval it denotes the presence of a binary "1" digit in the related position of the equivalent binary number. The absence of a Dash pulse denotes the presence of the binary "0" digit. The same Clock oscillator output is applied to further square wave generator circuits DTG and SPG which serve to provide the Dot and Strobe waveforms referred to in the paper by Williams and Kilburn describing the cathode ray tube store.

The Dash waveform is also applied to a pulse counting circuit DV1 which provides an output pulse for every five input pulses and the output from this circuit is, in turn, applied to a second pulse counting circuit DV2 which provides an output pulse for every nine input pulses. The output from the second circuit therefore consists of a pulse in synchronism with every 45th Dash pulse and the time period of 45 digit-intervals between such output pulses constitutes the beat or minor cycle period of the machine rhythm.

The first 40-digit intervals, referred to as the *p*0, *p*1 . . . *p*39 intervals, of each 45-digit group or beat are concerned with dealing respectively with the 40 binary digits, in the related ascending powers of 2, of the numbers used while the remaining five digit-intervals, *p*40 to *p*44, are reserved for the fly-back motion of the beams of the cathode ray storage tubes. This flyback period, during which the beams of the tubes are suppressed, is controlled by the negative-going pulse period of the Blackout waveform Fig. 2(*b*).

For the purpose of identifying and selecting any one of the 45-digit periods in each beat there is provided, each on separate leads, a series of isolated pulses known as *p*-Pulses, the *p*0 pulse waveform of Fig. 2(*d*) consisting of a single Dash pulse in the first or *p*0 digit interval of each beat, the *p*1 pulse waveform of a single Dash pulse in the second or *p*1 digit interval and so on one for each digit-interval terminating with the *p*44 pulse waveform of Fig. 2(*e*). The generation of such p-Pulse waveforms is effected by a pulse separating circuit PPG which effectively comprises a series of 45 serially interconnected trigger circuits P0, P1, P2 . . . P44 each controlling a gate circuit to which the Dash waveform is applied. The trigger circuits are arranged in the known manner of a ring counter whereby each circuit is triggered to open its associated gate circuit by the resetting of the immediately previous trigger circuit and is reset back by the triggering of the next following trigger circuit so that each of the gate circuits is opened, one after the other for the period of one digit interval to allow the passage of the coincident Dash pulse to its associated output lead. The start of each counting cycle is initiated and is therefore synchronised with the beat period by using the output from the second divider circuit DV2 as a triggering medium. The Blackout waveform of Fig. 2(*b*) is generated in a trigger circuit BOWG which is triggered to the condition providing a negative-going output voltage by the trailing edge of each *p*39 pulse and is reset to terminate the negative pulse period by the leading edge of each *p*0 pulse.

The requisite line scanning movement of the cathode-ray-tube beams in any of the storage devices to cause them to move sequentially over each of the 40 separate digit storage locations of any one storage line on the tube screen is produced by a common sawtooth deflection waveform generated in the X-time base circuit XTB. This circuit is of conventional construction and is triggered to commence its linear rundown period by the trailing edge of each Blackout pulse Fig. 3(*a*) and executes its flyback motion during such blackout pulse period. Paraphase versions of the X-time base or XTB waveform Fig. 3(*b*) are provided for push-pull deflection while all the other waveforms illustrated and referred to are available in anti-phase form, referred to hereinafter as the inverse or INV form.

As already mentioned the normal operating rhythm, during computation, is one of four beats S1, A1, S2 and A2 in every bar with store regeneration during scan beats S1, S2 and store address selection and use during the intervening action beats A1, A2. Whenever the machine is running but is not actually computing all beats are scan beats for regeneration purposes. The commencement of each operative 4-beat) bar is caused by the release of a special starting signal or Prepulse, Fig. 3(*d*) generated in unit PG, Fig. 10 from the trailing edge of an appropriate Blackout pulse selected by gate means G64 which are opened only upon the completion of the previous operation and the need to deal with a fresh instruction. Such unit PG comprises a gate G66 controlled by the INV S1, INV A1, and INV S2 waveforms and governing the supply of the *p*1-Pulse waveform to a further gate G65 which is normally held open by closure of a manual control switch 67 governing the supply of a negative potential thereto. The output from gate G65 is applied as a triggering medium to a two-stable-state trigger circuit 66 which is continually reset at the beginning of each beat by the *p*0-Pulse waveform. When triggered such circuit 66 supplies a gate opening potential to the gate G64 which is supplied with the Blackout waveform and whose output constitutes the Pre-Pulse signals referred to. The gate G66 is closed during the period of each S1, A1 and S2 beats following the release of a Prepulse signal but opens immediately thereafter to allow the next available *p*1-Pulse to pass therethrough thereby providing a triggering medium for the trigger circuit 66 which accordingly becomes triggered to allow the next following Blackout pulse to cause initiation of a new Prepulse and so to mark the commencement of a further 4 beat cycle. The four successive beats of the bar-interval which normally follows the release of a prepulse signal are identified by the four separate waveforms S1 of Fig. 3(*e*), A1 of Fig. 3(*f*), S2 of Fig. 3(*g*) and A2 of Fig. 3(*h*). These waveforms are generated in the chain of trigger circuits TS1, TA1, TS2 and TA2 the first trigger circuit TS1 being triggered by the Prepulse signal and reset by the next following Blackout pulse and the remaining trigger circuits TA1, TS2 and TA2 being each triggered by the resetting of the previous trigger circuit and reset by the next Blackout pulse following such triggering.

The various waveforms described above and derived within the unit WGU are presumed to be available wherever required throughout the machine but to avoid complexity of the diagram no attempt has been made to show each individual connection, the various leads being assumed to be included within the multiple lead *ml*. The existence of a connection between a particular connection point of any element of the machine as represented by either a symbol or a circuit diagram and any one of such waveform sources is indicated by the addition of an appropriate indicating label to such connection point such, for example, as is shown on the various parts of the storage devices MS, A and CL.

Figure 3:
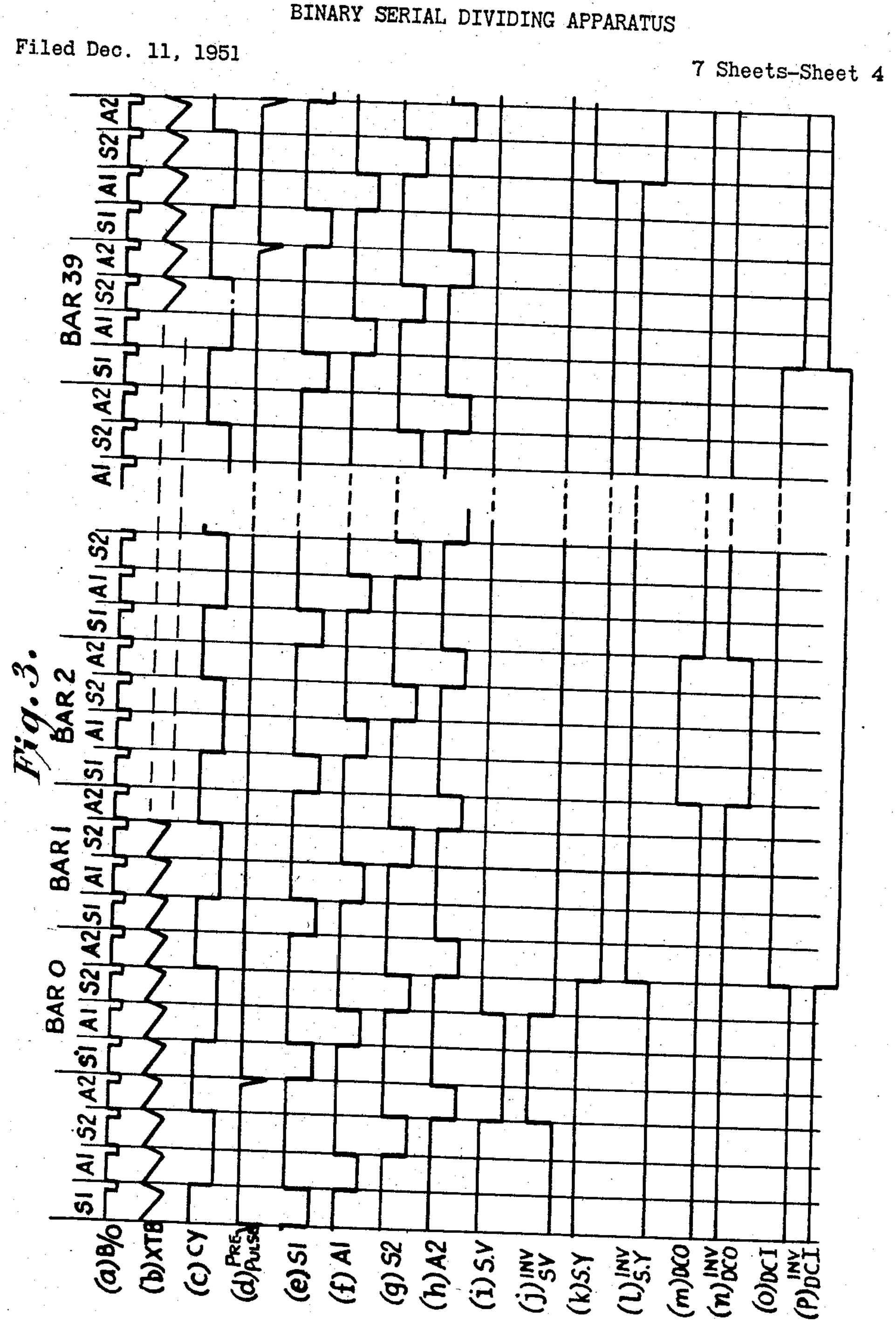
Figure 11:
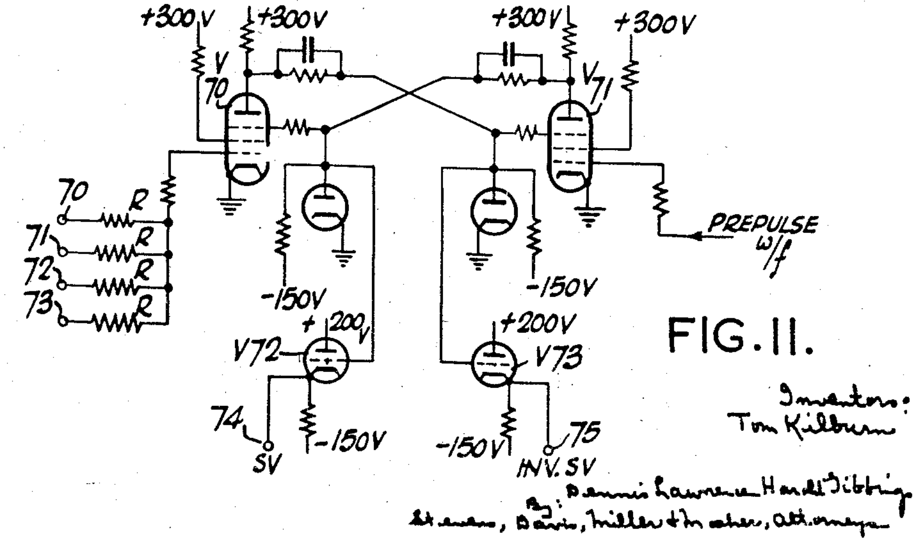
Fig. 11 illustrates schematically the form of a coding device such as those of CD1 and CD2 in Fig. 1*a*.

In addition to the above described recurrent waveforms provided by the unit WGU, the following description of the dividing arrangements according to the invention will refer to certain instruction waveforms which are derived through coding means from particular combinations of setting of those sections of the staticisor MST which deal with the so-called function digits of an instruction word. The coding means employed for deriving such instruction waveforms from a particular combination of settings of certain function digit sections of the staticisor MST in consequence of the arrival at the latter of an appropriate form of instruction is shown in Fig. 11 and comprises a two-stable-state trigger circuit of valves V70, V71 cross-connected between their respective anodes and the suppressor grids of the opposite valve in the usual manner. The trigger circuit is normally in the state where valve V71 is cut-off by the repeated application of Prepulses to its control grid and valve V70 is accordingly held turned-on. The potential of the suppressor grid of valve V70 is accordingly high (earth potential) and this is cathode-followed by valve V72 to provide a similar output level at output terminal 74. The opposite suppressor grid of valve V71 is low due to the lowered anode voltage of valve V70 and this is likewise cathode-followed by valve V73 to provide a negative-going output at terminal 75. The control grid of valve V70 is connected by way of similar leak resistors R and terminals 70, 71, 72 and 73 to a chosen one ("0" or "1") output terminals of four different function digit sections of the staticisor MST. Only when each terminal 70 . . . 73 is connected to a negative potential is the control grid of valve V70 driven negative. This occurs only when the chosen digit combination occurs in the instruction signal fed to the staticisor MST over lead 38. When the control grid of valve V70 is thus driven negative, valve V70 becomes cut-off and the trigger state reverses to provide a negative output at terminal 74 and a raised (earth) potential output at terminal 75. This state persists until the trigger state is again reversed by the next Prepulse arriving at the control grid of valve V71. The output from terminal 74 constitutes the normal, e.g. SV, waveform output whereas that from terminal 75 provides the anitphase or inverse version thereof, e.g. the INV SV waveform output. Thus the coding means CD1 which conveniently resembles the circuit arrangement of valves V4 and V5 of Fig. 21 of said paper by Williams, Kilburn and Tootill, with the various leak resistors R (of any desired number) connected respectively to appropriate output terminals of different staticisor sections in a manner exactly analagous to that described in said paper in connection with the selection of a particular storage tube, provides an output waveform S.V. which is negative whenever an instruction, known as the S.V. instruction and calling for the transference of a specified number dividend $D^x$ to a register in the divider circuit store, is being obeyed. At all other times this S.V. waveform is at zero potential. An inverse version, INV S.V, is also made available, this potential being normally negative and rising to zero only during the presence of such an S.V. instruction upon the staticisor MST. A second coding means CD2 is operative by another instruction, known as the S.Y. instruction and which follows the S.V. instruction and calls for the repeated transference of a further specified number (divisor $Y^x$) bar after bar until the dividing operation is completed. In similar manner the S.Y. potential is normally zero and is negative only during the time of an S.Y. instruction while the INV. S.Y. is exactly opposite, namely, normally negative and zero only during an S.Y. instruction. The S.V. waveform is shown at Fig. 3(*i*) and the S.Y. waveform in Fig. 3(*k*). The respective INV versions are shown at Fig. 3(*j*) and Fig. 3(*l*).

Figure 1B:
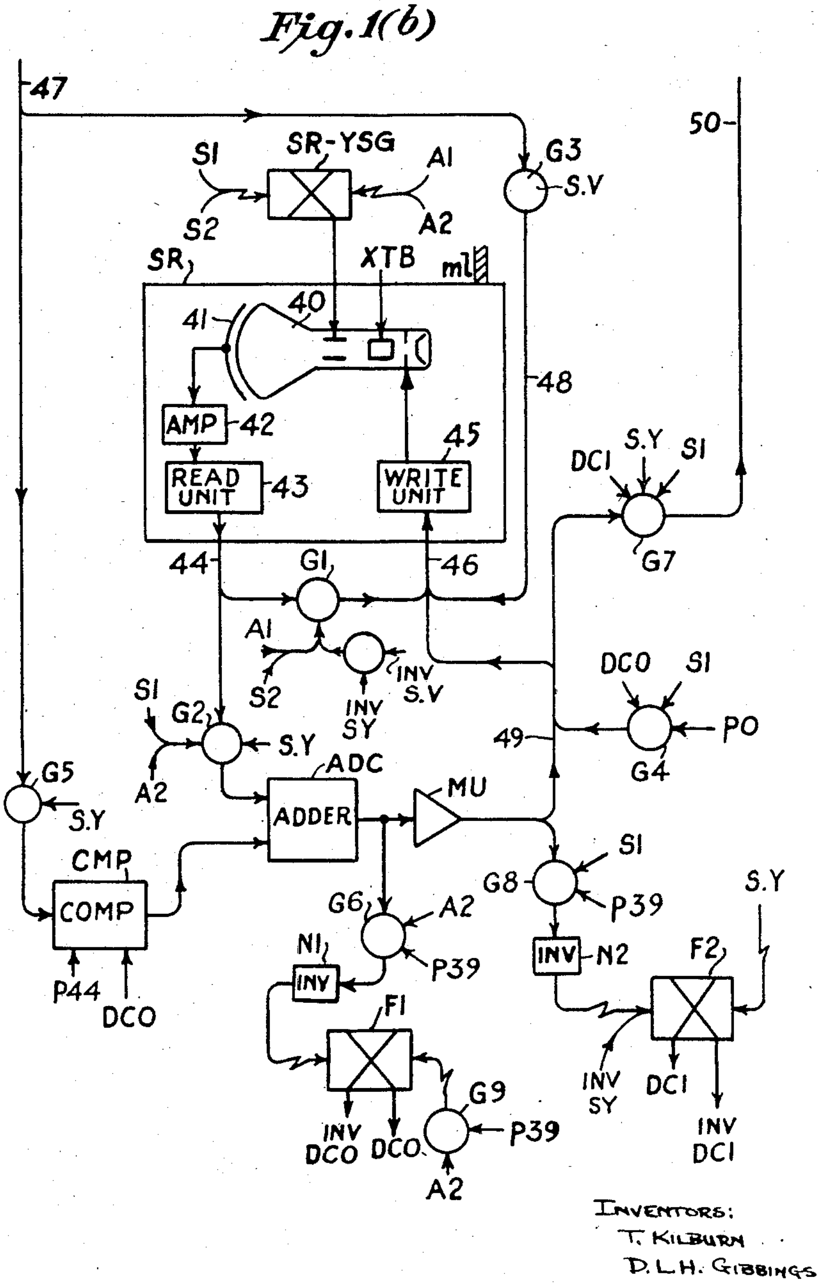

The dividing arrangements of the present invention are illustrated in Fig. 1(*b*) and comprise a further storage device, SR. consisting of a cathode-ray-tube 40 with its pick-up plate 41 and amplifier 42 feeding a read unit 43 having a signal output lead 44. The write unit 45 serves to control the beam modulation in accordance with signals applied over lead 46. This storage tube is arranged with the facility for storing a 40-digit number on each of two separate lines hereinafter referred to as the R and Q lines and the line in operation at any one time is determined by the Y-deflecting waveform supplied from a separate Y-shift generator SR—YSG which may comprise a trigger circuit which is triggered by the leading edges of both the S1 and S2 waveforms and is reset by the leading edges of both the A1 and A2 waveforms whereby the R line is scanned during beats A1, A2 and the Q line in beats S1 and S2.

The leads 44 and 46 are directly interconnected through an And gate G1 which is controlled so as to be opened either by a combination of the INV S.V. and INV S.Y waveforms or by the A1 waveforms or by the S2 waveform. The gate is thus opened during every A1 and every S2 beat and also during all beats of each bar when neither the S.V or the S.Y instruction is being obeyed. This direct interconnection provides for the normal straight regeneration of any contents of the R and Q lines.

The leads 44 and 46 are also interconnected by a second path including And gate G2, adder circuit ADC and a multiplying circuit MU which serves to increase the value of any applied signal by a factor of two. The And gate G2 is controlled so as to be opened only during the S1 and A2 beats whilst an S.Y instruction is being obeyed.

External signals coming from the main store of MS of the computing machine can be fed direct to the lead 46 by way of lead 47, And gate G3 and lead 48. The gate G3 is controlled by the S.V. instruction waveform whereby this input to the store is open only during the existence of an S.V. instruction upon the staticisor MST. A further source of external signals for application to write-input lead 46 is from a further And gate G4 which is controlled so as to allow the passage of a *p*0-Pulse therethrough only during any S1 beat which occurs whilst a trigger circuit F1, to be described later, is in its triggered condition.

The second input to the adder circuit ADC is derived also from the main store MS of the computing machine by way of lead 47, And gate G5 and a controllable number-complementing device CMP. One form of the latter will be described later but its function is to convert any input number fed thereto into the binary complement of such number whenever the controlling waveform DCO applied thereto is negative-going and to allow passage of such input number in unaltered form at all other times.

The sum-representing output from the adder-circuit ADC, in addition to application to the multiplier unit MU, is also applied, by way of And gate G6, inverter device N.1 and pulse differentiating means, as a resetting medium for the trigger circuit F1 for providing the DC0 and INV DC0 waveforms Figs. 3(*m*) and 3(*n*). This trigger circuit has its triggering input connected to And gate G9 supplied with *p*39 Pulses and controlled by the A2 waveform to allow passage of only that *p*39 Pulse which occurs at the end of any A2 beat to cause triggering of the trigger circuit if it has been reset at any time during the same bar.

The doubled value output from the multiplier unit MU may be supplied direct to the accumulator A of the computing machine by way of lead 49, And gate G7 and lead 50. The gate G7 is controlled so as to be opened only during the presence of an S.Y. instruction upon the staticisor MST and even then only during the S1 beats when a second trigger circuit F2, which generates the DC1 and INV DC1 waveforms, Figs. 3(*o*) and 3(*p*) is in its reset condition.

Such doubled output from the multiplier unit MU is also applied by way of And gate G8, inverter device N2 and pulse differentiating means as one resetting medium for said trigger circuit F2. An alternative resetting medium for the trigger circuit F2 is provided by the INV. S.Y. instruction waveform discussed above which is used in undifferentiated form and accordingly positively holds the trigger circuit F2 in reset condition at all times except during the time of an S.Y. instruction. The trigger circuit F2 is triggered at the instant of commencement of the S.Y. instruction by a differentiated version of the S.Y. instruction waveform.

The DC1 output (Fig. 3*p*) from this trigger circuit F2 is also used to control And gate G10 in the lead 34 by which selected *p*0-Pulses (in S1 beats) are applied to the adder circuit 36 of the control unit CL whereby such +1 signals to the control unit are suppressed whilst the trigger circuit F2 is in its triggered condition.

The operation of the arrangement will now be described with the aid of the timing diagram incorporated in Fig. 3. Initially the dividend number D and the divisor number Y are adjusted as to their value and sign by suitable previous programme steps involving multiplication by a suitable power of 2, 2*n*, whereby both are positive and $D^x-Y^x$ is equal to or greater than zero whilst $D^x-2Y^x$ is less than zero. The number *n* is suitably recorded and the adjusted members $D^x$ and $Y^x$ are stored in respective known address locations *t* and *y* in the main store MS. The programme of instructions, each signalled by a separate instruction word, is arranged with the various words located at different but sequential address locations in the main store and with the S.V. instruction word immediately preceding the S.Y. instruction at address locations X and $X+1$.

Operation of the computer then follows its normal course with the new $C.I+1$ number on the C.I line of the tube 30 in each S1 beat serving to set up the address selecting sections of the staticisor MST to the address location (defined by the instantaneous value of the number $C1+1$) of the next required present instruction P.I. which is then read out during the next beat A1 to the P.I line of the tube 30 where it is held until, in the next beat S2, it is read out to the staticisor MST to set up the latter, both to the address location (defined by the address digits of the P.I) of the required number and also to the appropriate gate control combination (defined by the function digits of the P.I) for routing the selected number during the final beat A2 to its destination.

When, in consequence of the change of the CI number in the control system CL to the number X, the next PI is the instruction S.V (to be carried out with the number held at location *d* in main store MS), this PI number is set up on the staticisor MST during beat S2 of the bar whereby, through coding device CD1, the S.V. waveform, Fig. 3(*i*) goes negative at the end of such beat. This PI number sets the generator YSG to level *d* in main store MS while the S.V. waveform opens gate G3 (Fig. 1*b*) so that, in beat A2, the dividend number $D^x$ is applied from the main store MS over lead 47 and gate G3 to the write unit 45 of the divider store and is recorded upon the R line which is being scanned during action beats. The gate G1 is held closed during this same beat A2 by the INV S.Y waveform being at zero level so that any previous content of the R line is automatically cleared.

In the following bar, Bar 0, of the main dividing operation, the CI number in the control tube 30 is increased in beat S.1 to the number $X+1$ and is fed to address-selecting sections of the staticisor MST where it sets up the storage location address of the next PI, i.e. the S.Y instruction, in the main store. In the next A1 beat this PI is transferred through gate G62 (Fig. 1*a*) to the P.I line of the control tube. The function digit sections of the staticisor MST are reset at the end of beat A1 so that the S.V waveform returns to zero level at this point. In the following beat S2, this S.Y instruction is fed to the staticisor MST to set up the storage address *y* of the division $Y^x$ and to provide the function digit combination necessary to operate coding device CD2 whereby the S.Y waveform goes negative at the end of the beat.

In the meantime, in beat A1, the gate G1 has been opened to regenerate the contents ($D^x$) of the R line of the tube 40. At the end of beat S2, the SY waveform triggers the trigger circuit F2 to cause the normally negative DC1 waveform to rise to zero as shown in Fig. 3(*o*). The trigger circuit F1 is continually triggered by the front edge of the *p*39-Pulse in beat A2 at the end of each bar so that the DC0 waveform, Fig. 3(*m*) remains negative. The gate G4, being controlled by the DC0 waveform, has allowed the passage of a *p*0-Pulse during beat S1 to the Q line of the tube 40 where it is stored in the lowest significant ($p^0$) position. This Q line is regenerated in unaltered form during beat S2 through gate G1.

In the fourth beat, A2, of this Bar 0, the number $Y^x$ is read out of the main store MS and is applied through gate G5, now opened by the S.Y waveform, and the complementer CMP to the adder circuit ADC. As the DC0 waveform is still negative the complementer is operative and it is the complemented version of $Y^x$ which arrives at the adder circuit in synchronism with the number $D^x$ being read out through gate G2. The sum output signal from the adder circuit ADC is thus $D^x-Y^x$ or remainder $R^0$. This is doubled in value, i.e. shifted one digit-interval towards higher significance, in unit MU and is written into the R line of tube 40 in place of $D^x$. The unmultiplied number $R^0$ is also examined for its sign by the passage of its most significant, *p*39, digit through gate G6. If, as will be the case at this first division step due to the initial adjustment of D or Y, the remainder $R^0$ is positive, the *p*39 digit will be "0" and trigger circuit F1 will remain triggered at least until the end of the A2 beat of the next following bar.

Due to the inhibition of the +1 input to the adder circuit 36 of the control system CL by the action of the DC1 waveform, the S.Y instruction in the control system CL remains unchanged and the division instruction persists for a total of 40 4-beat cycles as described later.

In the next following bar, Bar 1, in the S1 beat, the quotient number on line Q of tube 40 (at present 1000 . . . 0) is read out through gate G2 and through adder circuit ADC where it is unaltered in the absence of any second input and is then doubled in unit MU and rewritten into the same Q line with the addition of another *p*0-Pulse supplied through gate G4 to provide the number 11000 . . . 0. After multiplication in unit MU the quotient number will be examined at its *p*39 digit but this, being "0," will not alter the triggered state of circuit F2. During the A1 beat the $R^0$ number present on line R is regenerated without modification by way of gate G1 while in beat S2, the Q line content is similarly regenerated without change in the same way.

In the final beat A2 of this Bar 1, the divisor $Y^x$ is again read out of the main store MS and through gate G5 and complementer CMP to the adder circuit ADC in synchronism with the number $R^0$ coming from the tube 40 by way of gate G2. As the DC0 waveform is still negative, the complementer CMP is still operative and it is the complement of $Y^x$ which is added to $R^0$ and the resultant $R^1=R^0-Y^x$ which is tested for sign in gate G6 and doubled in unit MU before being rewritten into the R line of tube 40 in place of $R^0$.

Assuming this time that $Y^x$ is greater than $R^0$, then $R^1$ will be negative and will exhibit a "1" digit in its *p*39 position. The presence of this digit will be detected in gate G6 which will pass the selected *p*39 negative pulse to the inverter N1. The resultant inverted output from the latter will have a negative-going rear-edge which, after differentiation, serves to reset the circuit F1 and thus reverse the DC0 and INV DC0 waveforms as shown in Fig. 3(*m*) and 3(*n*).

In the next bar, Bar 2, the quotient number Q (11000 . . . 0) will be read out again in beat S1 through gate G2 to the adder circuit ADC where it will not be altered, in the absence of any second input to the latter, and then doubled in unit MU. The resultant number 01100 . . . 0 will, this time, not have a *p*0-Pulse inserted therein as gate G4 is now closed owing to the reversal of the DC0 waveform and the same number will be inserted in the Q line of the tube 40. The most significant digit will again be examined in gate G8 but as this is still "0" the trigger circuit F2 and waveforms DC1 and INV DC1 will remain unaltered. In the next beat A1 the remainder $R^1$ will be regenerated unaltered through gate G1 while in beat S2 the quotient number Q will likewise be regenerated unaltered in the same way. In the final beat A2 of this bar the number $Y^x$ will again be read out from the main store MS and applied to the adder circuit ADC in synchronism with the remainder number $R^1$ but as trigger circuit F1 is resting in its reset state with the DC0 waveform at zero level the complementer CMP is not operative and the applied $Y^x$ number is passed therethrough unaltered for addition to the remainder number $R^1$. This is, of course, correct since at the previous subtraction $Y^x$, although it was subtracted, should not have been and as the remainder number $R^1$ has since been doubled it is now $2Y^x$ less than it should be. Adding $Y^x$ at this point, instead of subtracting it thus corrects matters. The resultant remainder number R2 is then examined for sign in gate G6 as before and is doubled in unit MU and then reinserted in the R line of the tube 40.

The trigger circuit F1 will be triggered again at the leading edge of the P.39 Pulse in beat A2 to restore the DC0 waveform but if the remainder $R^2$ is again negative, it will be reset again at the trailing edge of the same pulse by the output from inverter N1. The trigger circuit F1 thus effectively remembers the sign of the preceding remainder number for the period of one bar.

The above cycle of operations, in one form (positive remainder) or the other (negative remainder) is repeated at each of the subsequent bars 3 . . . 39. At the last bar, Bar 39, the "1" digit which was inserted through gate G4 during the S1 beat of Bar 0 will have reached the *p*39 digit position as it issues from the unit MU in beat S1. In consequence it is detected in gate G8 and after inversion in inverter N2, serves to reset trigger circuit F2 by its differentiated trailing edge. The DCI waveform accordingly goes negative again at this point while the INV DCI waveform rises to zero level.

In the following beat A1 the remainder number $R^{38}$ is regenerated as usual as is the quotient Q in beat S2. In the beat A2 the divisor $Y^x$ is read out for the last time and is either added or subtracted, according to the previously determined sign $R^{38}$, to give a remainder which is again tested for sign in gate G6 and is then doubled in unit MU and fed to line R of tube 40. The last digit of the quotient Q, which is determined by such sign test has yet to be added and this is effected in beat S1 of the next bar when gate G4 is again opened if necessary to insert a further "1" on the *p*0 digit position after the previous Q number has been doubled in unit MU. As a result of this doubling, the original "1" digit which was inserted merely for use as an indicator, is lost and the remaining digits of the Q number are then fed out through gate G7 which is opened by the reversal of the DCI waveform, to the accumulator A of the associated machine.

The reversal of the trigger circuit F2 and the DCI waveform during Bar 39 has removed the previous inhibition of the +1 signal to the CI line of control tube 30 so that when a Prepulse is released at the end of Bar 39, +1 is also added to the CI line in the control system CL which then proceeds to select the next instruction, which may conveniently be one to correct the quotient Q inserted in the accumulator in accordance with the number *n* used in the initial adjustment of D or Y.

The S.Y waveform remains set up until the end of beat A1 of the new bar, which is concerned with the next instruction, and is then terminated. This produces closure of gates G5, G2 and G7 to cut off the dividing arrangements although the Q and $R^{39}$ numbers which are in the tube 40 still continue to be regenerated.

Figure 4:
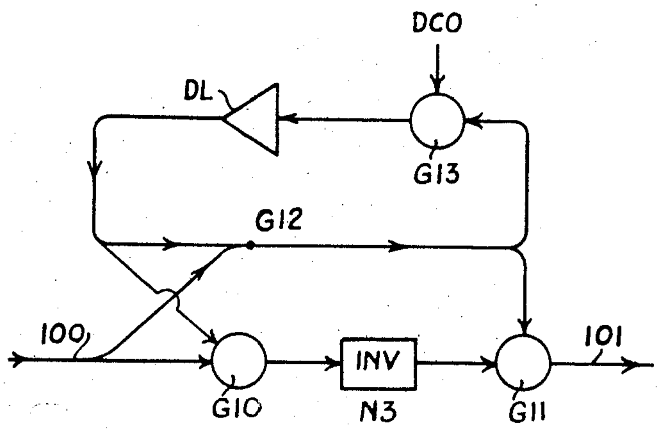
Figure 12:
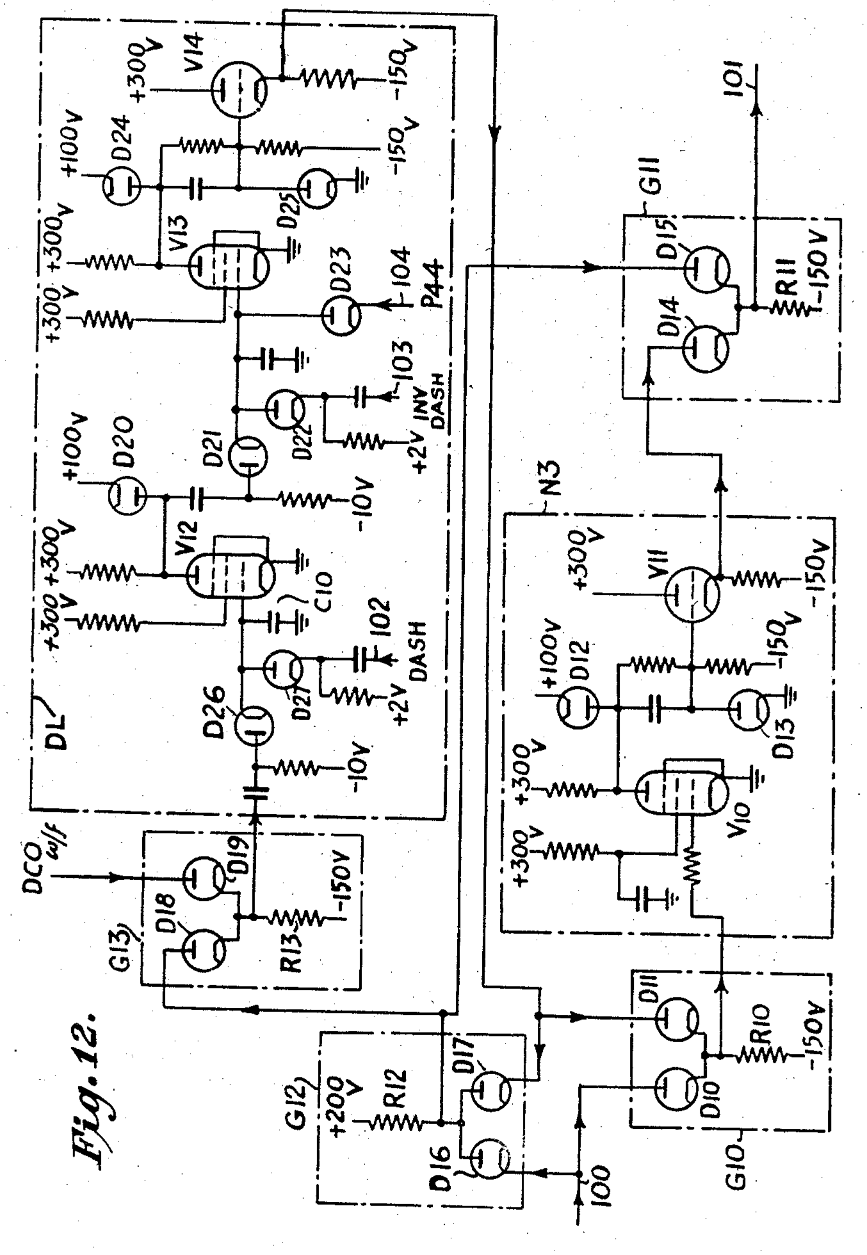
Fig. 12 is a detailed circuit diagram of the complementing circuit of Fig. 4.

A suitable form of complementer circuit CMP is shown in schematic form in Fig. 4 and in circuit detail in Fig. 12. Referring first to Fig. 4 the device comprises an And gate G10 having two controlling inputs one of which is constituted by the input signals on lead 100 and the other of which is supplied by the output from a delay device DL. The output from gate G10 is fed through an inverter N3 to form one control of another And gate G11 whose second control is derived either from the aforesaid delay device DL or from the input lead 100 by combination in an Or gate G12. The output from such gate G11 forms the signal output on lead 101.

The output from the Or gate G12 is also applied to a further And gate G13 which is also subjected to an overriding control waveform termed the "opening waveform" and constituted in the present instance by the DC0 waveform. The output from this gate is fed to the delay device DL which operates to provide a delay equal to one digit period.

The operation will be described with the aid of a specimen input signal which will be assumed to comprise the digit succession 0101. The first input digit, "0," characterised by the absence of any negative pulse during the related digit interval will be ineffective either to open gate G10 or gate G11 and the resultant output on lead 101 will be likewise a "0" signal. The next, "1" representing, negative-going pulse will be ineffective on gate G10 but will operate to open gate G11 since the inverter N3 has an output which is normally negative and which is raised to zero upon application of a negative-going input pulse. The resultant output on lead 101 is therefore a negative-going pulse for the period of the input pulse. In other words the first "1" digit is repeated through the device. The input "1" digit is also fed into the delay ring of gate G13 and device DL so as to emerge from the latter in the next following digit interval. The next digit, "0," is again ineffective upon either of gates G10, G11 but the latter is opened by the delayed "1" digit emerging from device DL in combination with the standing negative output from inverter N3 and a "1" signal is therefore fed to lead 101. The next digit "1" on lead 100 is applied to gate G10 in synchronism with the second arrival of the circulating "1" digit previously inserted into the delay ring whereby gate G10 is opened and the output from the inverter N3 changed from negative to zero potential. As a result of this gate G11 is not opened and the corresponding output on lead 101 is a "0." This, provided the delay ring is operative the input sign 0101 . . . is converted to the complement 0110.

If the gate G13 is not opened by the "opening" waveform then the delay ring is inoperative and any input "1" digit merely opens gate G11 to repeat the input signal without change.

In the practical circuit arrangement of Fig. 12, diodes D10 and D11 with resistor R10 constitute the And gate G10 while valve V10, V11 with diodes D12 and D13 constitute the inverter device N3 having a cathode follower output. The diodes D14, D15 and resistor R11 constitute the second And gate G11 and diodes D16, D17 with resistor R12 the Or gate G12. Diodes D18 and D19 with resistor R13 form the And gate G13 while valves V12, V13 and V14 with their associated diodes D20—D27 form the unit delay device DL.

The manner of operation of the And gates and Or gate is well known and needs no description. With the inverter device N3, valve V10 is normally heavily conducting as its control grid is at earth potential since both diodes D10, D11 have their anodes at about earth potential. In consequence the anode potential of valve V10 is low and the control-grid of cathode follower valve V11 is held negative with a resultant negative output at its cathode.

When valve V10 has its control grid driven negative by an input "1" pulse, the valve anode rises to +100 v. where it is caught by diode D12. A similar rise takes place at the control grid of valve V11 which latter is caught at earth potential by diode D13 to give a corresponding output from its cathode.

In the digit-interval delay circuit of valves V12—V14, valve V12 is normally cut-off on its control grid until the arrival of the differentiated positive-going pulse from the trailing edge of a "1" digit pulse. This turns the valve on and, by reason of the charging of condenser C10, the valve is held on until the arrival of the Dash pulse of the next following digit interval on lead 102 again cuts the valve off.

The initial negative swing of the anode of valve V12 is ineffective but the subsequent positive swing to +100 v. at which it is caught by diode D20, causes valve V13 to be turned on in similar manner to valve V12 until the arrival of the negative going trailing edge of the INV Dash waveform which immediately turns the valve V13 off again. The output at the anode of valve V13 is therefore, a fall at the beginning of the Dash pulse period immediately following that of the input pulse to valve V12 and a rise at the end of the same pulse period. This is cathode-followed by valve V14 to give the required output pulse one digit period later than the initiating input pulse.

In such a circuit the first valve V12 can be accepting a further pulse whilst the second valve V13 is delivering the delayed version of the previous input pulse. This is necessary in view of the requirement to deal with a succession of pulses but it is nevertheless necessary to ensure that a "1" input at the last, i.e. *p*39 digit-interval shall not be held over (in the usual absence of Dash or INV Dash pulses during the Blackout period) until the *p*0 digit interval of the next beat. To obviate this *p*44-Pulses are applied on lead 104 to clear the delay before the commencement of the next beat.

The remaining elements of the circuit of Fig. 1(*b*) need no detailed explanation. The unit MU can comprise a circuit arrangement resembling that of valves V12—V14 just described while the inverter devices N1, N2 can comprise arrangements similar to that of valves V10—V11. The trigger circuits F1, F2 can be of any suitable two-stable-state type and the adder circuit ADC any type suitable for dealing with two dynamic pulse train signals with simultaneous carry facility.

Although the particular circuit embodiment chosen to illustrate the invention utilises a two line divider store and is arranged in a four beat-to-the-bar machine with reading of the divisor $Y^x$ during every A2 beat, such restrictions obviously not inherent and other forms can clearly be devised, for example, wherein the divisor is read out in every Action beat.

We claim:

1. In an electronic binary digital computing machine operating with numbers expressed in dynamic serial form as pulse signal trains and including a main data signal storage device, the provision of a dividing arrangement comprising a single divider storage device having at least two separate number signal storage locations and read-out and write-in terminals common to both of said storage locations, a regenerative signal loop between said read-out and write-in terminals, said regenerative signal loop including an adding circuit followed by a multiplying circuit for doubling the value of any output from said adding circuit, a controlled first signal input connection from said main data signal storage device through said write-in terminal to the first of said storage locations, a controlled second input signal connection from said main data signal storage device to a second input of said adding circuit, said second input connection including signal-controlled means for converting any applied input signal into complemented form or for not converting said input signal in accordance with the form of a control signal applied to said signal controlled converting means, means for testing the signalled value of the most significant digit position of the output signal from said adding circuit, and means for deriving a control signal for said signal controlled converting means from the output of said testing means to render said converting means operative to complement when said tested digit positin value is "0" and to render said converting means inoperative to complement when said tested digit position value is "1."

2. An arrangement for effecting division of binary numbers in an electronic digital computing machine which comprises an electric signal storage device having a first number signal storage location for a dividend number-representing signal and a second number signal storage location for a quotient-representing signal, said storage locations being rendered accessible alternately at a common read output lead and a common write input lead, a regenerative loop between said read output and write input leads which includes an adding circuit having first and second input leads and an output lead, and a multiplying circuit having an input lead and an output lead for doubling the value of a number-representing signal applied to said input lead, the first input lead of said adding circuit being supplied with number-representing signals from said write output lead and the output lead of said adding circuit being connected to said input lead of said multiplying circuit and the number-representing signals on said output lead of said multiplying circuit being applied to said write input lead to rewrite the doubled value number-representing signals issuing from said adding circuit into said same storage location of said storage device, a source of repeatedly presented electric signals representing the divisor number, said signals occurring in synchromism with the periods of accessibility of said dividend number storage location, a signal converting device having an input lead and an output lead and a control input lead, said converting device operating to convert an input electric signal representing a number into an output electric signal representing the complement of such number when said control input lead is energised and operating to transmit said input signal as an output signal in unaltered form when said control input lead is not energised, circuit means connecting said input lead of said converting device to said source of divisor number-representing signals and for connecting said output lead of said converting device to said second input lead of said adding device, signal testing means connected to said output lead of said adding circuit for determining the algebraic sign of each number-representing signal issuing from said output lead of said adding circuit as determined by the signalled value of a chosen digit of such signal and providing a control signal when the sign of said number-representing signal is positive and means for applying said control signal to control said complement converting device, signal generating means operated by said control signal outputs from said sign testing means for deriving a series of digit signals representing the quotient number and circuit means for applying said derived digit signals to said write-input lead during the periods of accessibility of said quotient number storage location.

3. An arrangement for effecting division of binary numbers in an electronic digital computing machine which comprises a single electric signal storage device having at least two number storage locations, a first location for a dividend number-representing signal and a second location for quotient representing signal respectively, said storage device having a read output lead and a write input lead common to both of said storage locations and a regenerative loop between said read output and write input leads which includes a first signal transmission path through an adding circuit having first and second input leads and an output lead, and a multiplying circuit having an input lead and an output lead for doubling the value of a number-representing signal applied to said input lead, the first input lead of said adding circuit being supplied with number-representing signals from said write output lead and the output lead of said adding circuit being connected to said input lead of said multiplying circuit and the number-representing signals on said output lead of said multiplying circuit being applied to said write input lead to rewrite the doubled value number-representing signals issuing from said adding circuit into said same storage location of said storage device, a source of repeatedly presented electric signals representing the divisor number, a signal converting device having an input lead and an output lead and a control input lead, said converting device operating to convert an input electric signal representing a number into an output electric signal representing the complement of such number when said control input lead is energised and operating to transmit said input signal as an output signal in unaltered form when said control input lead is not energised, circuit means connecting said input lead of said converting device to said source of divisor number-representing signals and for connecting said output lead of said converting device to said second input lead of said adding device, signal testing means connected to said output lead of said adding circuit for determining the algebraic sign of each number-representing signal issuing from said output lead of said adding circuit as determined by the signalled value of a chosen digit of such signal and providing a control signal when the sign of said number-representing signal is positive and means for applying said control signal to control said complement converting device and signal generating means operated by said control signal outputs from said sign testing means for deriving a separate digit signal of a signal representing the quotient number at each operation of said sign testing means and circuit means for applying each of said derived digit signals of said quotient number to said storage device for retention in said second storage location.

4. An arrangement for effecting division of binary numbers in an electronic digital computing machine which comprises a single electric signal storage device having at least a first number storage location for a dividend number-representing signal and a second number storage location for a quotient representing signal, said storage device having a read output lead and a write input lead common to both of said storage locations, a regenerative loop between said read output and write input leads which includes an adding circuit having first and second input leads and an output lead, and a multiplying circuit having an input lead and an output lead for doubling the value of a number-representing signal applied to said input lead, the first input lead of said adding circuit being supplied with number-representing signals from said write output lead and the output lead of said adding circuit being connected to said input lead of said multiplying circuit and the number-representing signals on said output lead of said multiplying circuit being applied to said write input lead to rewrite the doubled value number-representing signals issuing from said adding circuit into said same storage location of said storage device, a source of repeatedly presented electric signals representing the divisor number, a signal converting device having an input lead and an output lead, said converting device operating to convert an input electric signal representing a number into an output electric signal representing the complement of such number, circuit means connecting said input lead of said converting device to said source of divisor number-representing signals and for connecting said output lead of said converting device to said second input lead of said adding device, an alternative path between said source and said second input of said adding device in which said source signals are not converted, signal controlled means for determining which path between said source and said adding device is operative, signal testing means connected to said output lead of said adding circuit for determining the algebraic sign of each number-representing signal issuing from said output lead of said adding circuit and providing a control signal which is variable according to whether the sign of said number-representing signal is positive or negative, means for applying said control signal to control said path-determining means, signal generating means operated by said control signal outputs from said sign testing means for deriving a signal representing the quotient number and circuit means for applying said derived quotient-representing signal to said write-input lead for storage in said second storage location.

5. An arrangement for effecting division of binary numbers in an electronic digital computing machine, which comprises an electric signal storage device including a cathode ray tube storage arrangement for number storage on at least two separate lines, a first of said storage lines forming a storage location for a dividend number-representing signal and a second of said storage lines forming a storage location for a quotient-representing signal, said cathode ray tube storage arrangement having a read output lead, a write input lead and a regenerative loop between said read output and write input leads which includes a first signal transmission path through an adding circuit having first and second input leads and an output lead, and a multiplying circuit having an input lead and an output lead for doubling the value of a number-representing signal applied to said input lead, the first input lead of said adding circuit being connected to be supplied with number-representing signals from said read output lead and the output lead of said adding circuit being connected to said input lead of said multiplying circuit and the number-representing signals on said output lead of said multiplying circuit being applied to said write input lead to rewrite the doubled value number-representing signals issuing from said adding circuit into said same storage line in said cathode ray tube storage arrangement, a source of repeatedly presented electric signals representing the divisor number, a signal converting device having an input lead and an output lead and a control input lead, said converting device operating to convert an input electric signal representing a number into an output electric signal representing the complement of such number when said control input lead is energized and operating to transmit said input signal as an output signal in unaltered form when said control input lead is not energised, circuit means connecting said input lead of said converting device to said source of divisor number-representing signals and for connecting said output lead of said converting device to said second input lead of said adding device, signal testing means connected to said output lead of said adding circuit for determining the alegbraic sign of each number-representing signal issuing from said output lead of said adding circuit as determined by the signal lead value of a chosen digit of such signal and providing a control signal when the sign of said number-representing signal is postive and means for applying said control signal to control said complement converting device and signal generating means operated by said control signal outputs from said sign testing means for deriving a separate digit signal of a signal representing the quotient number at each operation of said sign testing means and circuit means for applying each of said derived digit signals of said quotient number to said cathode ray tube storage arrangement for retention in said second storage line.

6. An arrangement in accordance with claim 5 which comprises a shunting signal transmission path between said read output and write input leads of said cathode ray tube storage arrangement and signal controlled switching means in each of said first and said shunting signal paths, said switching means being controlled to render either path operable and the other path inoperable at any one time.

7. An arrangement for effecting division of binary numbers in an electronic digital computing machine, which comprises an electric signal storage device having at least two number storage locations, a first location for a dividend number-representing signal and a second location for a quotient representing signal respectively, said storage device having a read output lead, a write input lead and a regenerative loop between said read output and write input leads which includes a first signal transmission path through an adding circuit having first and second input leads and an output lead, and a multiplying circuit having an input lead and output lead for doubling the value of a number-representing signal applied to said input lead, the first input lead of said adding circuit being supplied with number-representing signals from said read output lead and the output lead of said adding circuit being connected to said input lead of said multiplying circuit and the number-representing signals on said output lead of said multiplying circuit being applied to said write input lead to rewrite the doubled value number-representing signals issuing from said adding circuit into said same storage location of said storage device, a source of repeatedly presented electric signals representing the divisor number, a signal converting device having an input lead and an output lead and a control input lead, said converting device operating to convert an input electric signal representing a number into an output electric signal representing the complement of such number when said control input lead is energised and operating to transmit said input signal as an output signal in unaltered form when said control input lead is not energised, circuit means connecting said input lead of said converting device to said source of divisor number-representing signals and for connecting said output lead of said converting device to said second input lead of said adding circuit, signal testing means connected to said output lead of said adding circuit for determining the algebraic sign of each number-representing signal issuing from said output lead of said adding circuit as determined by the signalled value of a chosen digit of such signal and providing a control signal when the sign of said number-representing signal is positive and means for applying said control signal to control said complement converting device and signal generating means operated by said control signal outputs from said sign testing means for deriving a separate digit signal of a signal representing the quotient number at each operation of said sign testing means and circuit means for applying each of said derived digit signals of said quotient number to said storage device for retention in said second storage location, each of said digit signals being inserted in said second storage location to occupy initially the digit signal position of lowest significance, said quotient-representing digit signals being also repeatedly passed through said multiplying circuit once for each presentation of said divisor number-representing signal to said dividend number store.

8. An arrangement in accordance with claim 7 which includes means for inserting a binary "1" digit signal record into said quotient number store before the first presentation of said divisor number-representing signal to said dividend number store and means for detecting the presence of such inserted "1" digit signal at the position of greatest significance in said quotient-representing number signal and then terminating the dividing operation.

References Cited in the file of this patent

UNITED STATES PATENTS

| | | |
|---|---|---|
| 2,623,171 | Woods-Hill et al. | Dec. 23, 1952 |
| 2,701,095 | Stibitz | Feb. 1, 1955 |

OTHER REFERENCES

"First Draft of a Report on the EDVAC" by John Von Neuman June 1945 (pages 36–39).

Proc. of the IRE, "A Digital Computer for Scientific Applications" by West et al. Dec. 1948, (pps. 1452–1460).